(12) United States Patent
James et al.

(10) Patent No.: US 10,826,746 B1
(45) Date of Patent: Nov. 3, 2020

(54) TRANSMISSION SECURITY BASED ON ADAPTIVE MULTIRESOLUTION MODULATION

(71) Applicant: Naval Information Warfare Center, San Diego, CA (US)

(72) Inventors: Justin O. James, San Diego, CA (US); Michael P. Daly, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/808,700

(22) Filed: Mar. 4, 2020

(51) Int. Cl.
| | |
|---|---|
| *H04L 27/34* | (2006.01) |
| *H04L 1/00* | (2006.01) |
| *H04L 27/18* | (2006.01) |
| *H04L 27/00* | (2006.01) |

(52) U.S. Cl.
CPC ........ *H04L 27/3488* (2013.01); *H04L 1/0003* (2013.01); *H04L 1/0041* (2013.01); *H04L 27/0008* (2013.01); *H04L 27/183* (2013.01); *H04L 27/3405* (2013.01)

(58) Field of Classification Search
CPC ............ H04L 27/3405; H04L 27/3422; H04L 27/3444; H04L 27/3488; H04L 27/36; H04L 27/366; H04L 27/38; H04L 41/0816; H04B 1/02; H04B 1/06; H04B 17/15
See application file for complete search history.

(56) References Cited

U.S. PATENT DOCUMENTS

| | | | |
|---|---|---|---|
| 6,658,059 B1 | 12/2003 | Iu et al. | |
| 7,197,090 B1* | 3/2007 | Berger | H04L 25/062 |
| | | | 375/287 |
| 8,249,374 B2 | 8/2012 | Short et al. | |
| 9,953,246 B2 | 4/2018 | Bouchard et al. | |
| 10,742,473 B1* | 8/2020 | James | H04L 27/3488 |
| 2008/0152141 A1 | 6/2008 | Short et al. | |
| 2013/0336649 A1* | 12/2013 | Essiambre | H04L 27/06 |
| | | | 398/27 |
| 2016/0204971 A1* | 7/2016 | Mouhouche | H04L 27/3483 |
| | | | 370/207 |
| 2019/0305996 A1* | 10/2019 | Handte | H04L 5/0044 |

OTHER PUBLICATIONS

J. James et al., "Adaptive Multiresolution Modulation for Multimedia Traffic over Nakagami Fading Channels," International Journal of Wireless & Mobile Networks (Apr. 2012), pp. 1-20.
K. Yang et al., "Unequal Error Protection for Streaming Media Based on Rateless Codes," IEEE Transactions on Computers, vol. 61 No. 5, May 2012,pp. 666-675.
Odejide et al., "Adaptive Multiresolution Modulation for Multimedia Traffic in Dynamic Wireless Environment," 34th IEEE Sarnoff Symposium, May 3-4, 2011, 6 pages.

* cited by examiner

*Primary Examiner* — Siu M Lee
(74) *Attorney, Agent, or Firm* — Naval Information Warfare Center, Pacific; Kyle Eppele (57) ABSTRACT

A transmitter adjustment value for adjusting modulations at a transmitter may be determined. The transmitter may be configured to transmit in accordance with an asymmetric signal constellation, based on the determined transmitter adjustment value. A legitimate receiver may be provided with a receiver adjustment value corresponding to the determined transmitter adjustment value. At the transmitter, scrambled transmissions may be transmitted, based on transmitting using the determined transmitter adjustment value.

20 Claims, 8 Drawing Sheets

TRANSMISSION SECURITY BASED ON ADAPTIVE MULTIRESOLUTION MODULATION

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac t2@navy.mil. Reference Navy Case No. 104067.

BACKGROUND

Security is an ongoing concern in most networking environments. Much research is devoted to determining techniques for confounding potential eavesdroppers in communications.

In network transmissions, Adaptive Multiresolution Modulation (AMM) permits adaptation of both the shape (β) and the size of an asymmetric signal constellation. The spectral efficiency gain achieved through the employment of AMM at the physical (PHY) layer (of the Open Systems Interconnection (OSI) model) may be substantial (e.g., up to fifty percent (50%) increase), especially at low and moderate carrier-to-noise ratio (CNR) (see, e.g., J. James et al., "Adaptive Multiresolution Modulation for Multimedia Traffic over Nakagami Fading Channels," International Journal of Wireless & Mobile Networks (April 2012), pp. 1-20 ("James 1" hereinafter) and J. James et al., "Adaptive Multiresolution Modulation for Multimedia Traffic." IEEE Consumer Communications and Networking Conference (CCNC) (Jan. 9-12, 2012), pp. 697-698 ("James 2" hereinafter)). This performance gain is achieved by mapping higher priority buffer bits to higher protected bit positions within the symbol and other bits to less protected bit positions, enabling partial modulated symbol recovery. Because of the partial modulated symbol recovery facilitated, AMM may avoid the "cliff effect" in which all data transmission cuts out when the channel becomes very poor. Instead, there may be a graceful degradation and the most important data may still be sent through all but the worst channel outages.

As further explanation of constellations, a constellation diagram is a representation of a signal modulated by a digital modulation scheme such as quadrature amplitude modulation or phase-shift keying. The diagram represents the signal as a two-dimensional xy-plane scatter diagram in the complex plane at symbol sampling instants. The angle of a point, measured counterclockwise from the horizontal axis, represents the phase shift of the carrier wave from a reference phase. The distance of a point from the origin represents a measure of the amplitude or power of the signal.

In a digital modulation system, information may be transmitted as a series of samples, each occupying a uniform time slot. During each sample the carrier wave has a constant amplitude and phase which may be restricted to one of a finite number of values, so each sample encodes one of a finite number of "symbols", which in turn represent one or more binary digits (bits) of information. Each symbol may be encoded as a different combination of amplitude and phase of the carrier, so each symbol may be represented by a point on the constellation diagram. The constellation diagram may represent all the possible symbols that can be transmitted by the system as a collection of points. In a frequency or phase modulated signal, the signal amplitude is constant, so the points lie on a circle around the origin.

The carrier representing each symbol can be created by adding together different amounts of a cosine wave representing the "I" or in-phase carrier, and a sine wave, shifted by 90° from the I carrier called the "Q" or quadrature carrier. Thus, each symbol may be represented by a complex number, and the constellation diagram may be regarded as a complex plane, with the horizontal real axis representing the I component and the vertical imaginary axis representing the Q component. A coherent detector may independently demodulate these carriers. The principle of using two independently modulated carriers is the foundation of quadrature modulation. In pure phase modulation, the phase of the modulating symbol is the phase of the carrier itself.

A "signal space diagram" refers to an ideal constellation diagram showing the correct position of the point representing each symbol. After passing through a communication channel, due to electronic noise or distortion added to the signal, the amplitude and phase received by the demodulator may differ from the correct value for the symbol. When plotted on a constellation diagram the point representing that received sample may be offset from the correct position for that symbol. For example, a vector signal analyzer can display the constellation diagram of a digital signal by sampling the signal and plotting each received symbol as a point. The result is a "ball" or "cloud" of points surrounding each symbol position. For example, measured constellation diagrams may be used to recognize the type of interference and distortion in a signal.

SUMMARY

According to one general aspect, a method may include determining a transmitter adjustment value for adjusting modulations at a transmitter. The transmitter may be configured to transmit in accordance with an asymmetric signal constellation, based on the determined transmitter adjustment value. A legitimate receiver may be provided with a receiver adjustment value corresponding to the determined transmitter adjustment value, and at the transmitter, scrambled transmissions may be transmitted, based on transmitting using the determined transmitter adjustment value.

According to another aspect, a method may include receiving, at a network receiver, from a transmitter, a receiver adjustment value corresponding to a transmitter adjustment value. The network receiver may be configured to demodulate signals received from the transmitter, in accordance with an asymmetric signal constellation, based on the determined transmitter adjustment value. At the network receiver, a scrambled transmission may be received from the transmitter, and the received scrambled transmission may be unscrambled by demodulating the received scrambled transmission, based on demodulating using the received receiver adjustment value corresponding to the transmitter adjustment value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DETAILED DESCRIPTION

Figure 1:
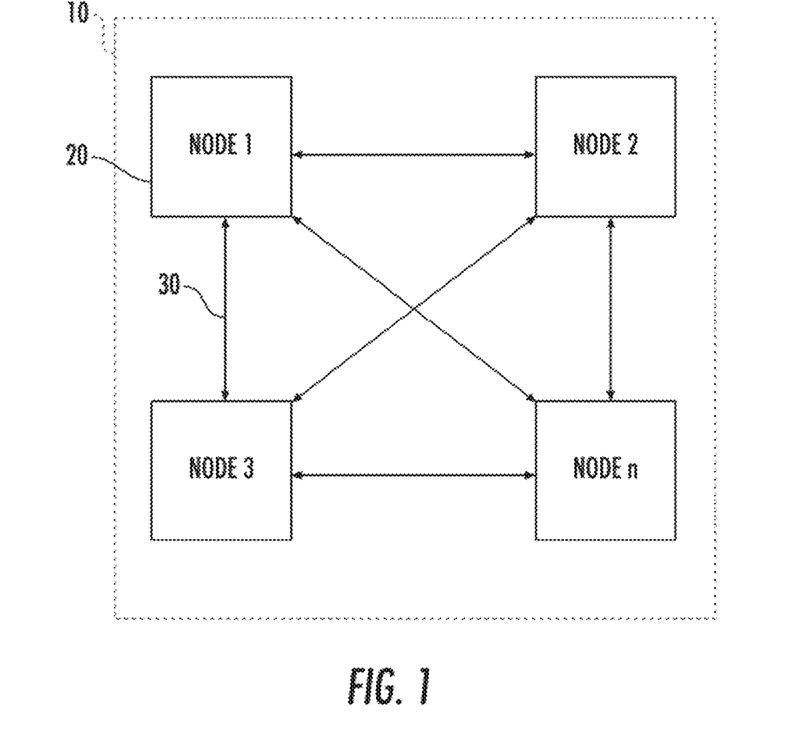
FIG. 1 is a block diagram of an example system having a distributed network architecture.

FIG. 1 is a block diagram of an example system 10 having a distributed network architecture that may be used to implement techniques discussed herein. System 10 may include a plurality of nodes 20 that are each configured to send signals 30 to each of the other nodes 20 and receive signals 30 from each of the other nodes 20. Nodes 20 may be organized in any type of distributed network configuration. In some embodiments, nodes 20 are fixed in their location within the network. In some embodiments, nodes 20 are mobile and are able to move about within the network. In some embodiments, system 10 may include both fixed and mobile nodes. In some embodiments, nodes 20 comprise sensors that may be used to detect objects within an environment.

Figure 2:
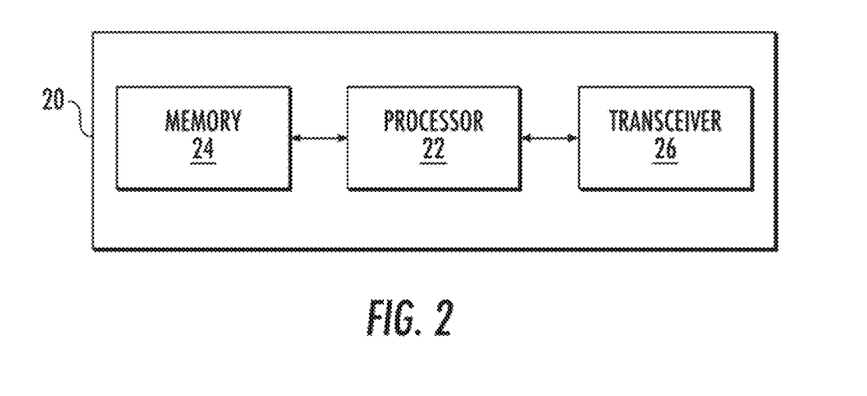
FIG. 2 is a block diagram of an example node in the distributed network architecture shown in FIG. 1.

FIG. 2 is a block diagram of an example of a node 20. As shown, node 20 includes a processor 22 operatively connected to a memory unit 24 and a transceiver 26. In some embodiments, processor 22 is a general purpose processor. In some embodiments, processor 22 is a processor that is specifically programmed to contain instructions therein, readable by the processor, that allow the processor to send/receive information to/from memory unit 24 and transceiver 26, as well as to cause transceiver 26 to send/receive signals in accordance with embodiments discussed herein. Further, depending on the particular application of the node, e.g., a sensor, node 20 may include more components therein to allow the node to perform functions required by the specific application.

Figure 3:
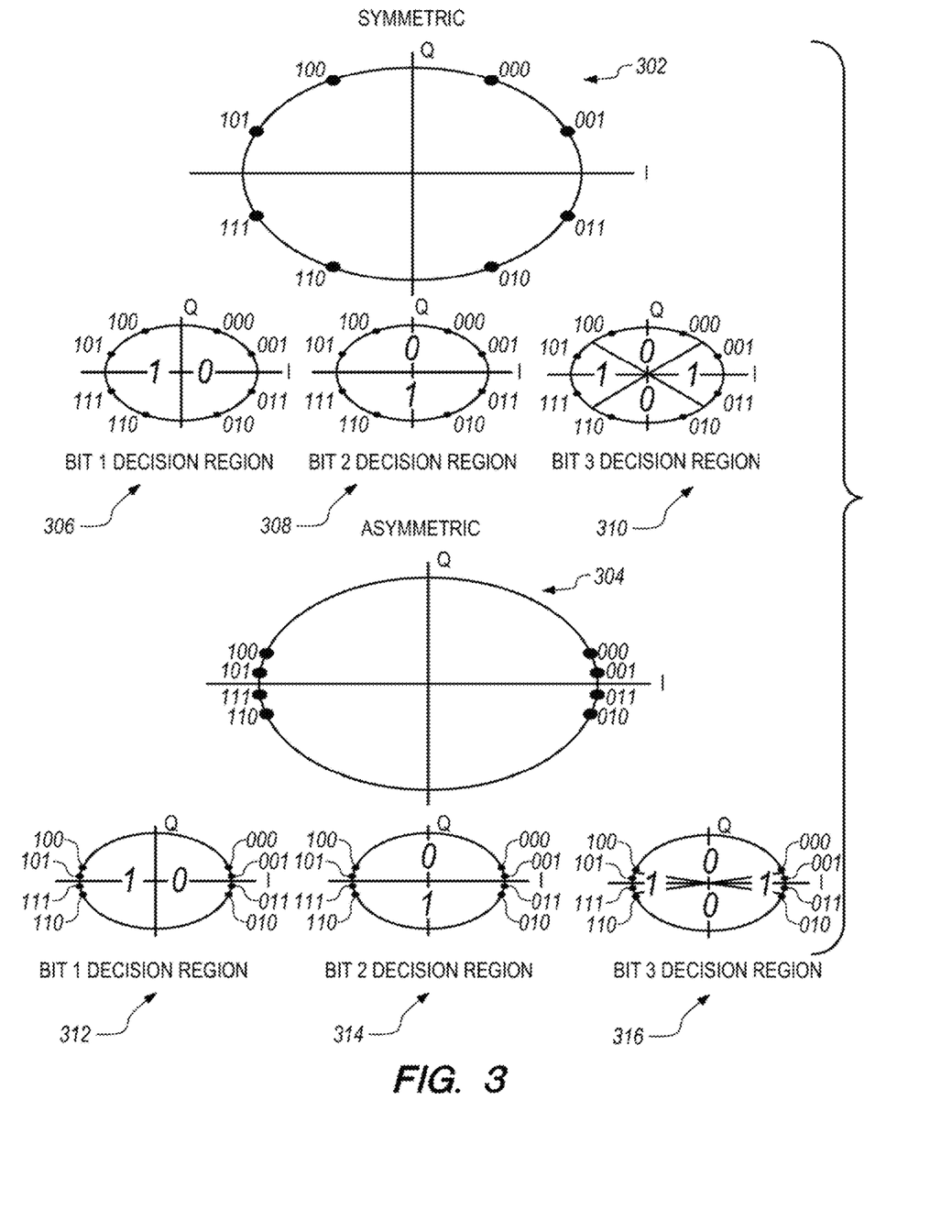
FIG. 3 illustrates a comparison of Symmetric 8-PSK and Asymmetric 8-PSK.

At a receiver, demodulation, symbol-to-bit translation, may be based on pre-defined decision regions. FIG. 3 illustrates a comparison of Symmetric 8-PSK (302) and Asymmetric 8-PSK (304), as shown by constellation diagrams. In FIG. 3, the decision regions for bit 1, bit 2, and bit 3 for both symmetric and asymmetric 8-PSK (phase-shift keying) are shown. As shown, decision region 306 illustrates the decision region for bit 1 for symmetric 8-PSK, decision region 308 illustrates the decision region for bit 2 for symmetric 8-PSK, and decision region 310 illustrates the decision region for bit 3 for symmetric 8-PSK. As shown, decision region 312 illustrates the decision region for bit 1 for asymmetric 8-PSK, decision region 314 illustrates the decision region for bit 2 for asymmetric 8-PSK, and decision region 316 illustrates the decision region for bit 3 for asymmetric 8-PSK. If the transmitted symbol is received in the correct decision region, the symbol may be demodulated correctly. If the transmitted symbol is received in the incorrect decision region due to attenuation, noise, interference, or some other phenomena, the symbol may be demodulated erroneously. Consequently, transmitted symbols closer to the decision region boundary may need less corruption to be received in the incorrect decision region and are more likely to be received in error.

Figure 4:
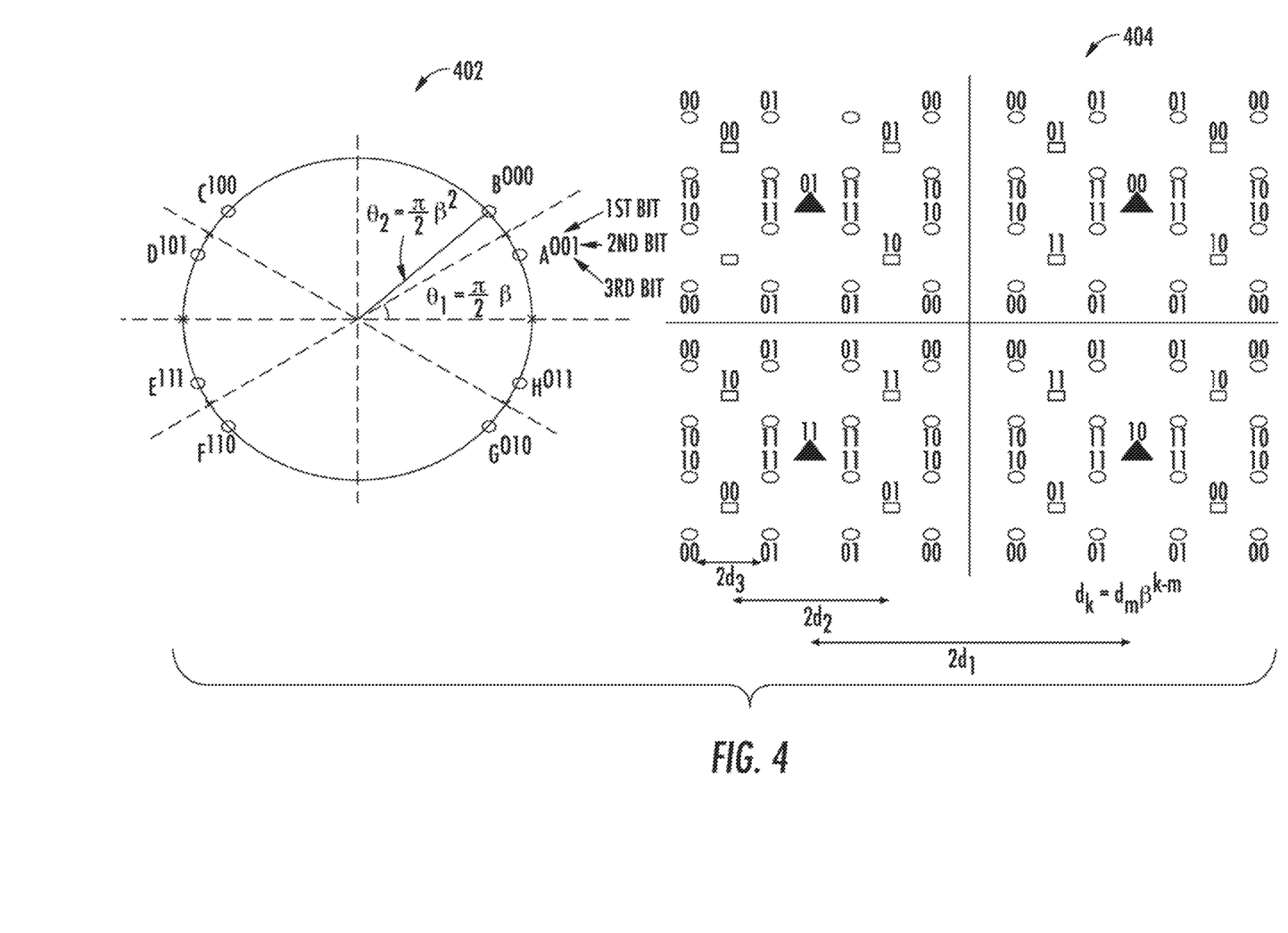
FIG. 4 illustrates an Asymmetric 8-PSK constellation, and a 4/16/64 QAM constellation.

As mentioned above, conventionally, practical communications systems have used symmetric modulation. Thus, it is highly likely that any eavesdropping node(s) will use a receiver optimized for symmetric modulations. FIG. 4 illustrates a) an Asymmetric 8-PSK constellation (402), and b) a 4/16/64 QAM (Quadrature amplitude modulation) constellation (404).

If the transmitter adapts the shape ($\beta$) of the constellation, then as shown in FIG. 4, the decision regions will correspondingly change at an intended (legitimate) receiver. In this context, an "intended receiver" or a "legitimate receiver" refers to a receiver that a sender intends to receive transmissions, as opposed to an "eavesdropping receiver," which the sender does not intend to receive transmissions. For example, a transmitter may send information regarding a current $\beta$ adaptation of the shape of the transmitter constellation to intended receivers so that the intended receivers may adapt accordingly (e.g., by adjusting decision regions at the receiver). For example, the information may be sent separately from transmitted information, specifically as parameters for adjusting the receiver. If the receiver does not adjust the decision regions accordingly, some bits may be demodulated incorrectly. As the $\beta$ mismatch becomes larger, the number of demodulation errors due to incorrect decision region mapping may increase. Eventually, the $\beta$ mismatch may become sufficiently large to effectively scramble the received data. This scrambling induced by AMM may provide enhanced security in network transmissions.

AMM may permit adaptation of both the shape and the size of the asymmetric signal constellation, improving the throughput for multi-service data while fulfilling distinct Quality of Service (QoS) packet error rate (PER) requirements for each traffic type under different channel conditions.

In symmetric modulation signal constellations, the minimum distance between any one symbol and all others may be the same. Such a constellation design may provide each bit within a modulated symbol with approximately the same level of protection. Consequently, data encoded to each bit within a modulated symbol has approximately the same bit error rate (BER) characteristics. Symmetric modulations may be acceptable for conventional stove-piped communications systems dedicated to only one function and QoS requirement. In such a system, symmetric modulation constellations may be optimal, because the QoS requirement for all transmitted data is homogeneous.

In asymmetric modulation, the signal constellation may be pre-distorted, for example, to increase resource utilization efficiency when transmitting multi-service, heterogeneous data. By pre-distorting the signal constellation, heterogeneous QoS requirements may be satisfied while not wasting resources. In asymmetric modulation, the shape of the signal constellation may be dictated by the QoS requirements at the application (APP) layer. For cases in which the QoS BER or PER requirements are closer to one another, the optimal signal constellation shape is more symmetric. For cases in which the QoS BER or PER requirements are farther apart from each other, the optimal signal constellation shape may be more asymmetric.

As discussed above, at the receiver, demodulation, symbol-to-bit translation, is based on pre-defined decision regions. In FIG. 3, these decision regions for bit 1, bit 2, and bit 3 for both symmetric and asymmetric 8-PSK are illustrated, as discussed above. For symmetric 8-PSK (302), all of the constellation symbols are equidistant in the signal space. Thus, for symmetric 8-PSK, the BER and PER characteristics of each bit are roughly the same. For asymmetric 8-PSK (304), as the constellation becomes more asymmetric, bit 1 is farther from the decision region and less vulnerable to corruption. However, bit 2, and especially bit 3 may move closer to the decision regions and may be more vulnerable to corruption.

As mentioned above, eavesdropping node(s) may use a receiver optimized for symmetric modulations. Thus, if the transmitter adapts the shape ($\beta$) of the constellation, the correct decision regions will change at a receiver. If the receiver does not adjust the decision regions accordingly, some bits may be demodulated incorrectly. As the $\beta$ mismatch becomes larger, the number of demodulation errors due to incorrect decision region mapping may increase. Eventually, the $\beta$ mismatch may become sufficiently large to effectively scramble the received data.

Figure 5:
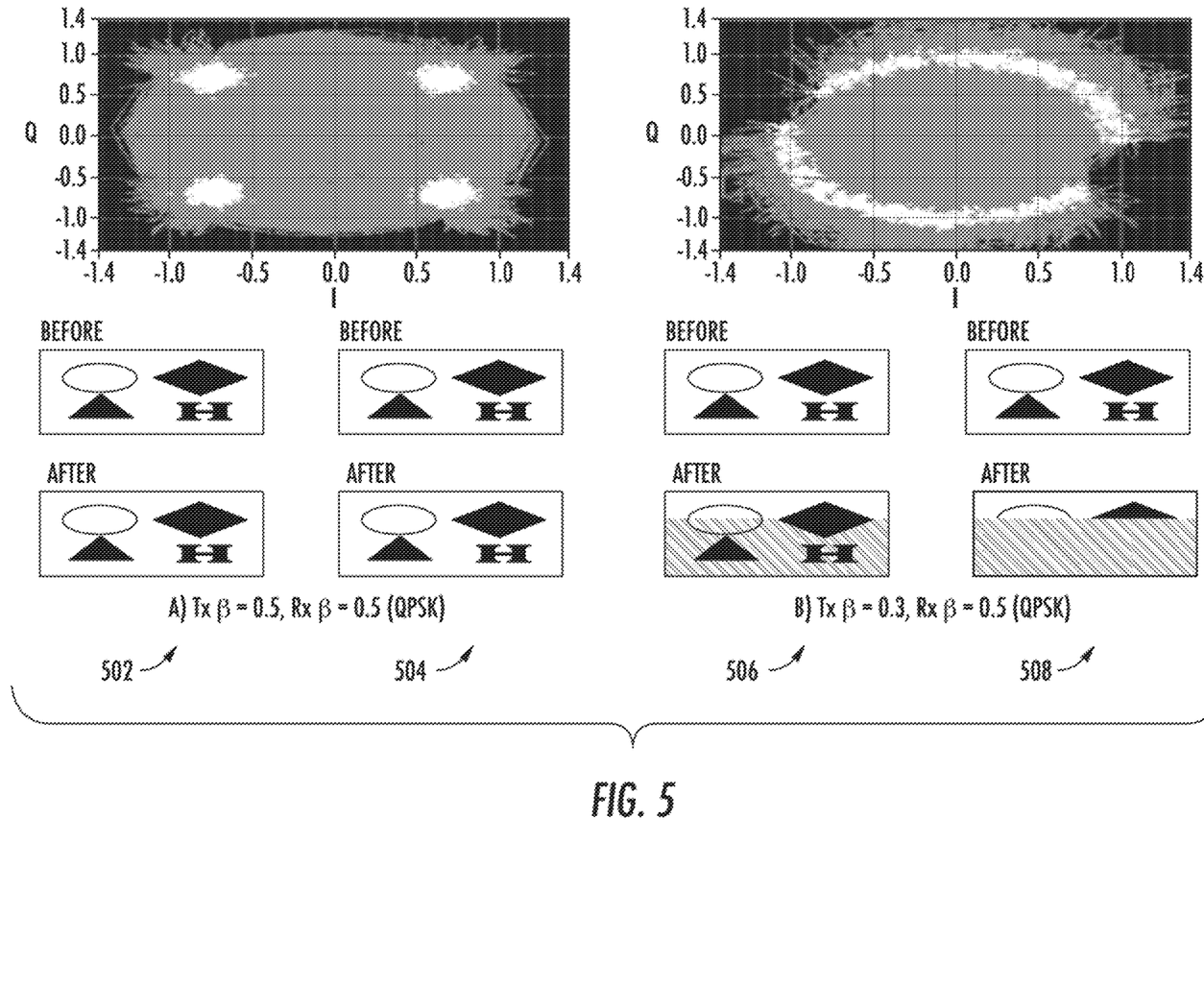
FIG. 5 illustrates a received I-Q constellation graph.
Figure 6:
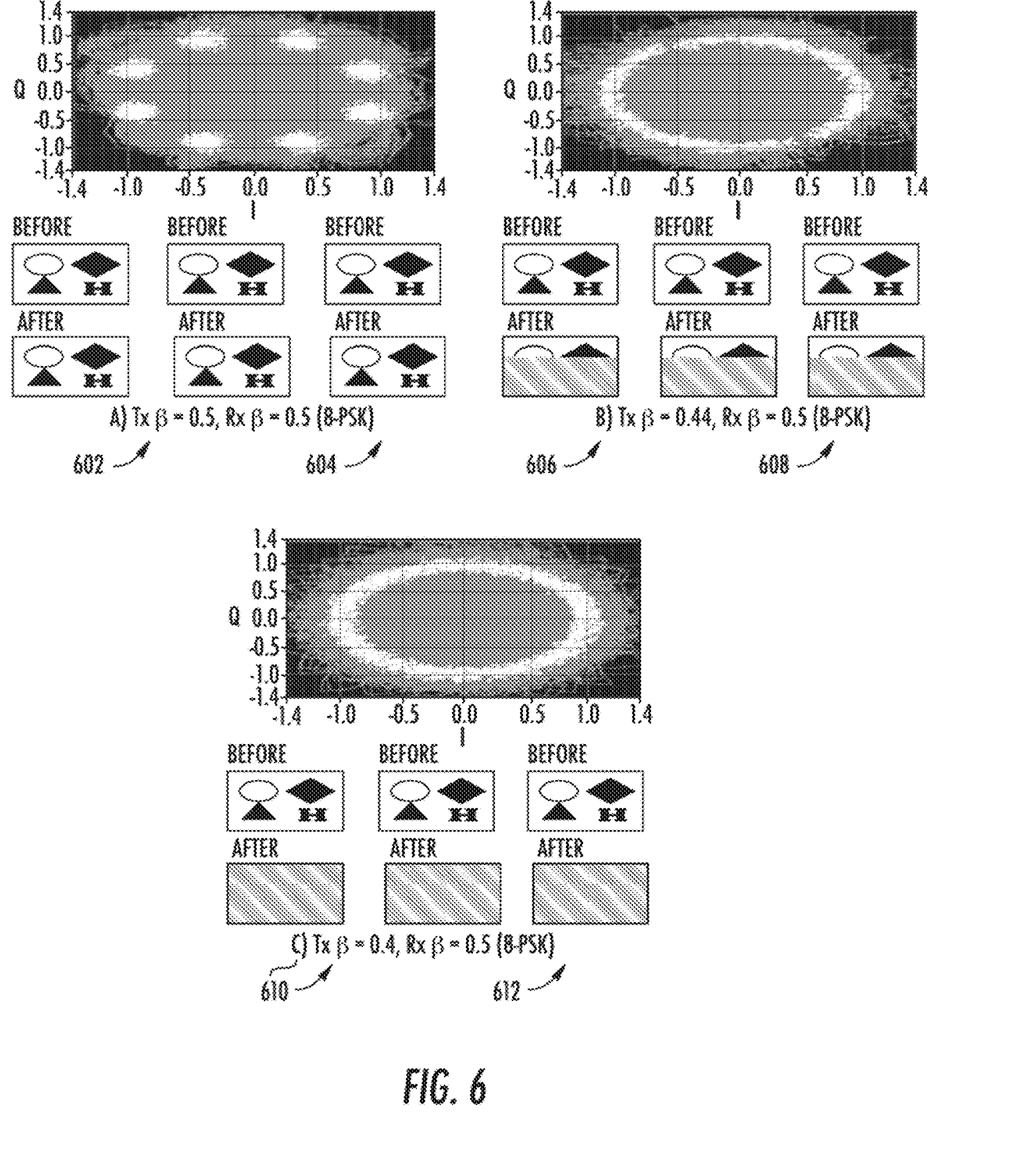
FIG. 6 illustrates a received I-Q constellation graph.
Figure 7:
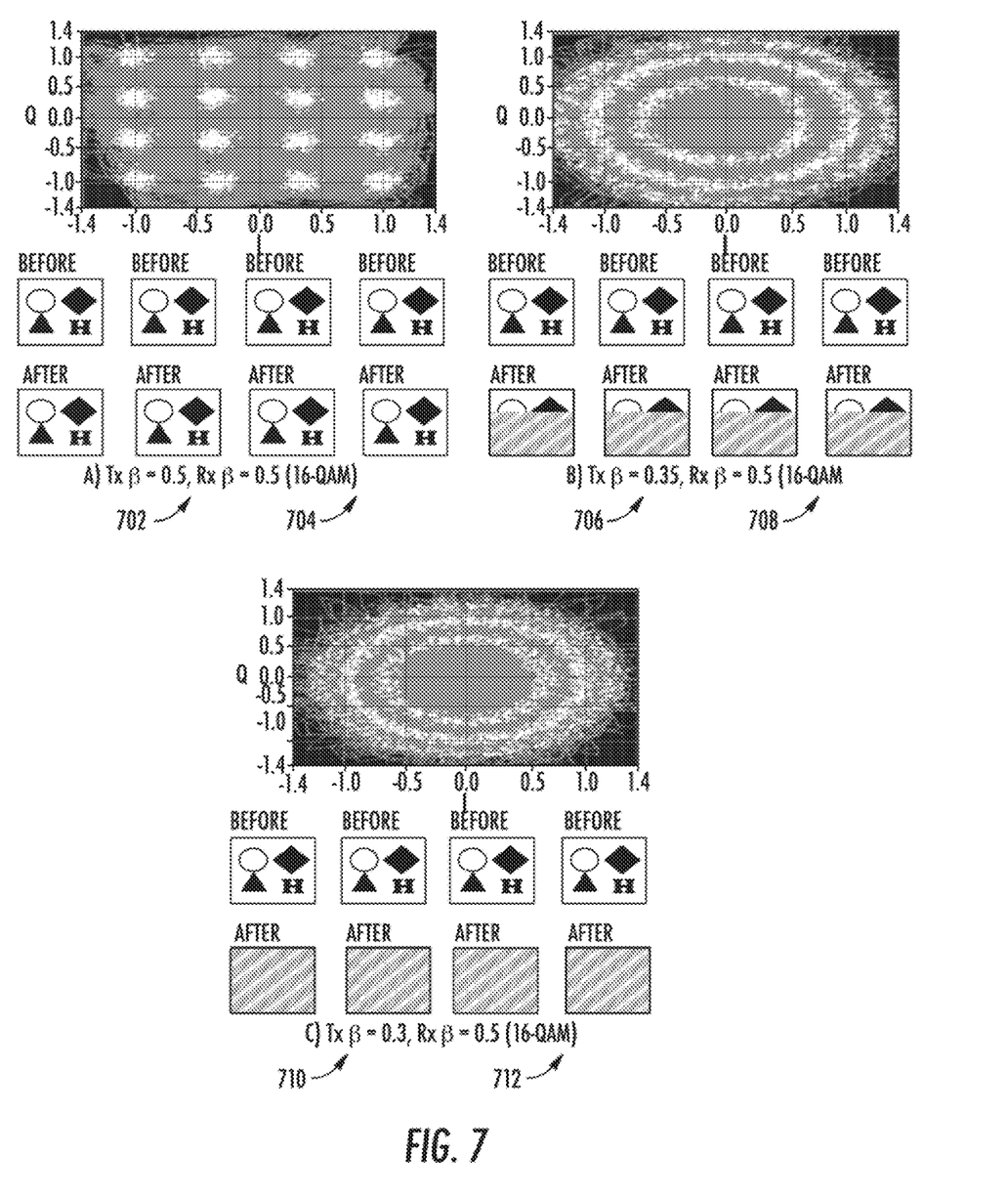
FIG. 7 illustrates a received constellation graph.

For each modulation mode (QPSK (Quadrature Phase Shift Keying), 8-PSK, and 16-QAM (Quadrature amplitude modulation)), tests have been performed to evaluate the performance to determine the effects of the $\beta$ mismatch between the transmitter and receiver. In accordance with test results, for all three modes, the error-free signal-to-noise ratio (SNR) for asymmetric and symmetric modulation was established to be 20 decibels (dB). By performing the characterization at this SNR, it may be assured that the major contributor to degradation is the $\beta$ mismatch and not some other phenomena. (FIGS. 3, 4, and 5) FIGS. 5-7 illustrate the effects of the $\beta$ mismatch. Each shows the received I-Q constellation graph and thumbnail images. For example, FIG. 5 illustrates a received I-Q constellation graph and thumbnail images for a) symmetric Tx $\beta$=0.5 (502), symmetric Rx $\beta$=0.5 (QPSK) (504); and b) asymmetric Tx $\beta$=0.3 (506), Symmetric Rx $\beta$=0.5 (QPSK) (508). For example, FIG. 6 illustrates a received I-Q constellation graph and thumbnail images for a) symmetric Tx $\beta$=0.5 (602), symmetric Rx $\beta$=0.5 (8-PSK) (604); b) asymmetric Tx $\beta$=0.44 (606), symmetric Rx $\beta$=0.5 (8-PSK) (608); and c) asymmetric Tx 13=0.4 (610), symmetric Rx $\beta$=0.5 (8-PSK) (612). For example, FIG. 7 illustrates a received constellation graph and thumbnail images for a) symmetric Tx $\beta$=0.5 (702), Symmetric Rx $\beta$=0.5 (16-QAM) (704); b) asymmetric Tx $\beta$=0.35 (706), symmetric Rx $\beta$=0.5 (16-QAM) (708); and c) asymmetric Tx $\beta$=0.3 (710), symmetric Rx $\beta$=0.5 (16-QAM) (712).

Tables 1, 2, and 3 include the BER measured for each modulation mode using mismatched-$\beta$. For example, Table 1 shown below, illustrates BER measured over-the-air for QPSK using mismatched-$\beta$ between the transmitter (Tx) and receiver (Rx).

TABLE 1

BER Measured Over-the-Air for QPSK using Mismatched-$\beta$ between the Tx and Rx

| SNR (dB) | Tx Beta ($\beta$) | Rx Beta ($\beta$) | BER Bit 1 | BER Bit2 |
|---|---|---|---|---|
| 20 | 0.50 | 0.50 | 0.00E+00 | 0.00E+00 |
| 20 | 0.45 | 0.50 | 0.00E+00 | 0.00E+00 |
| 20 | 0.40 | 0.50 | 0.00E+00 | 0.00E+00 |
| 20 | 0.35 | 0.50 | 0.00E+00 | 0.00E+00 |
| 20 | 0.30 | 0.50 | 2.52E-01 | 2.07E-01 |

For example, Table 2 shown below, illustrates BER measured over the air for 8-PSK using mismatched-$\beta$ between the Tx and Rx.

TABLE 2

BER measured over the air for 8-PSK using mismatched-$\beta$ between the Tx and Rx

| SNR (dB) | Tx Beta ($\beta$) | Rx Beta ($\beta$) | BER Bit 1 | BER Bit2 | BER Bit3 |
|---|---|---|---|---|---|
| 20 | 0.50 | 0.50 | 0.00E+00 | 0.00E+00 | 0.00E+00 |
| 20 | 0.48 | 0.50 | 0.00E+00 | 0.00E+00 | 0.00E+00 |
| 20 | 0.46 | 0.50 | 3.92E-04 | 1.51E-04 | 1.29E-04 |
| 20 | 0.44 | 0.50 | 1.40E-01 | 7.29E-02 | 6.78E-02 |
| 20 | 0.42 | 0.50 | 4.72E-01 | 4.72E-01 | 4.68E-01 |
| 20 | 0.40 | 0.50 | 5.04E-01 | 5.00E-01 | 4.97E-01 |

For example, Table 3 shown below, illustrates BER measured over the air for 16-QAM using mismatched-$\beta$ between the Tx and Rx.

TABLE 3

BER measured over the air for 16-QAM using mismatched-$\beta$ between the Tx and Rx

| SNR (dB) | Tx Beta ($\beta$) | Rx Beta ($\beta$) | BER Bit 1 | BER Bit2 | BER Bit3 | BER Bit4 |
|---|---|---|---|---|---|---|
| 20 | 0.50 | 0.50 | 0.00E+00 | 0.00E+00 | 0.00E+00 | 0.00E+00 |
| 20 | 0.45 | 0.50 | 2.69E-05 | 0.00E+00 | 8.97E-06 | 0.00E+00 |
| 20 | 0.40 | 0.50 | 4.24E-04 | 0.00E+00 | 1.03E-04 | 0.00E+00 |
| 20 | 0.35 | 0.50 | 5.12E-02 | 4.79E-02 | 4.80E-02 | 4.55E-02 |
| 20 | 0.30 | 0.50 | 3.43E-01 | 5.02E-01 | 3.34E-01 | 5.02E-01 |

In accordance with test results, for QPSK, performance was substantially degraded at a forty percent (40%) $\beta$ mismatch (TX $\beta$=0.3, RX $\beta$=0.5). For this case, one out of every four bits was received in error. For 8-PSK, performance was substantially degraded at a twelve percent (12%) $\beta$ mismatch (TX $\beta$=0.44, RX $\beta$=0.5). At a sixteen percent (16%) $\beta$ mismatch (TX $\beta$=0.42, RX $\beta$=0.5), performance was completely degraded. In this case, one out of every two bits was received erroneously. For 16-QAM, performance was severely degraded at a thirty percent (30%) $\beta$ mismatch (TX $\beta$=0.35, RX $\beta$=0.5). At a forty (40%) $\beta$ mismatch (TX $\beta$=0.3, RX $\beta$=0.5), performance was completely degraded with one out of every two bits being received incorrectly. Given this, AMM may be employed to increase transmission security in the presence of an eavesdropping node. Through the testing, it was demonstrated that $\beta$ mismatches between a transmitter and receiver may cause a degradation of receiver performance. From the results, one may also conclude that lower order modulations may need a larger $\beta$ mismatch to affect the performance of the receiver, because sparser constellations have larger decision regions. Consequently, more shape distortion may be needed to alter the decision regions sufficiently to cause a substantial number of demodulation errors.

In summary, AMM may advantageously enhance transmission security without increasing transmission power or bandwidth. $\beta$ mismatches between a transmitter and receiver may cause severe and/or complete degradation of (symmetrically configured) receiver performance.

Other techniques for providing transmission security include low probability of interception (LPI), low probability of detection (LPD), and antijam (AJ) schemes. LPI, LPD, and AJ techniques all use additional bandwidth for direct sequence spread spectrum (DSSS) or frequency hopping.

However, bandwidth (spectrum) may be a highly limited and expensive resource. Consequently, AMM may provide increased transmission security without a necessity for additional bandwidth.

Additionally, transmission security may be provided through encryption. However, AMM may be employed with encryption to provide more robust transmission security than encryption alone.

Example aspects discussed herein may be implemented as a series of modules, either functioning alone or in concert with physical electronic and computer hardware devices. Example techniques discussed herein may be implemented as a program product comprising a plurality of such modules, which may be displayed for a user. As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine readable recordable media.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

Figure 8:
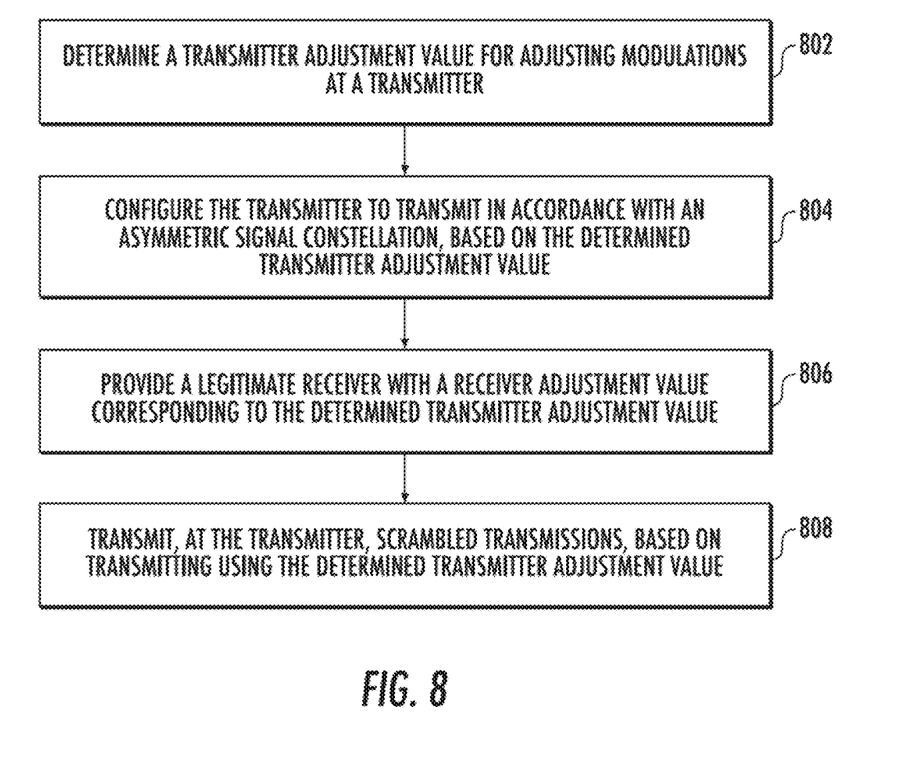
FIG. 8 is a flowchart illustrating example operations of the system of FIG. 2, according to example embodiments.

FIG. 8 is a flowchart illustrating example operations of the system of FIG. 2, according to example embodiments. As shown in the example of FIG. 8, a transmitter adjustment value may be determined for adjusting modulations at a transmitter (802).

The transmitter may be configured to transmit in accordance with an asymmetric signal constellation, based on the determined transmitter adjustment value (804). A legitimate receiver may be provided with a receiver adjustment value corresponding to the determined transmitter adjustment value (806). At the transmitter, scrambled transmissions may be transmitted, based on transmitting using the determined transmitter adjustment value (808).

For example, configuring the transmitter may include modifying a shape of a current signal constellation in use for transmitting at the transmitter.

For example, configuring the transmitter may include modifying a size of a current signal constellation in use for transmitting at the transmitter.

For example, configuring the transmitter may include modifying a shape of a current symmetric signal constellation in use for transmitting at the transmitter, to the asymmetric signal constellation.

For example, configuring the transmitter may include configuring the transmitter to transmit in accordance with adaptive multiresolution modulation.

For example, configuring the transmitter may include configuring the transmitter to transmit in accordance with encryption and adaptive multiresolution modulation.

For example, configuring the asymmetric signal constellation is based on a representation of signals modulated by a digital modulation scheme.

Figure 9:
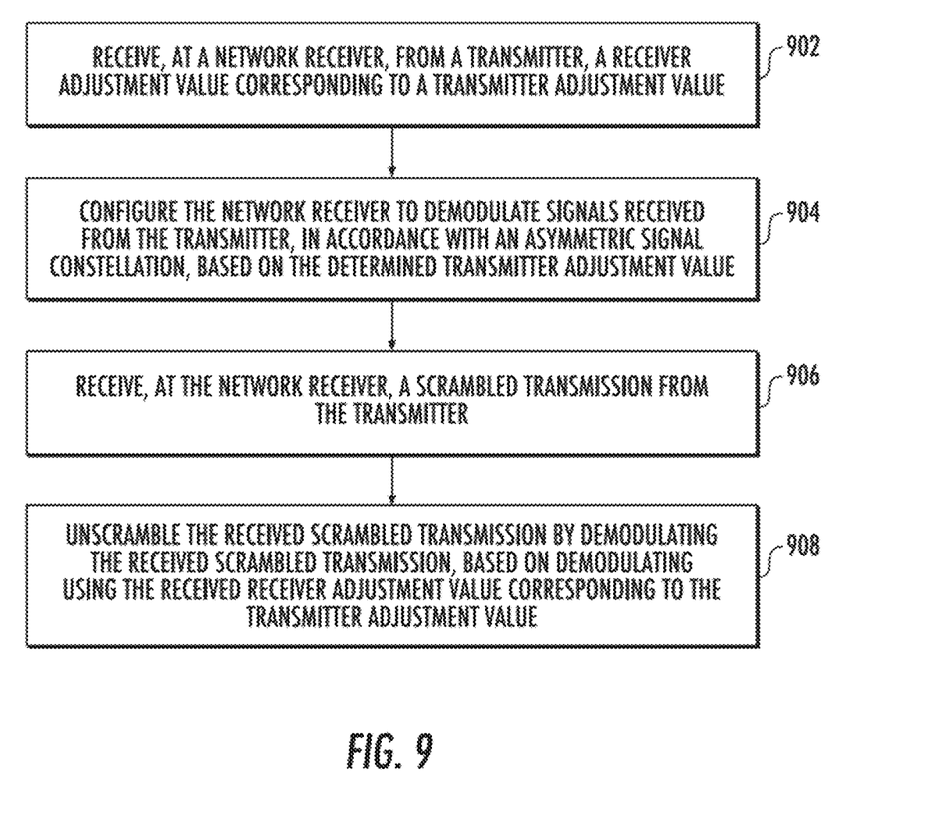
FIG. 9 is a flowchart illustrating example operations of the system of FIG. 2, according to example embodiments.

FIG. 9 is a flowchart illustrating example operations of the system of FIG. 2, according to example embodiments. As shown in the example of FIG. 9, at a network receiver, a receiver adjustment value corresponding to a transmitter adjustment value may be received from a transmitter (902).

The network receiver may be configured to demodulate signals received from the transmitter, in accordance with an asymmetric signal constellation, based on the determined transmitter adjustment value (904). At the network receiver, a scrambled transmission may be received from the transmitter (906). The received scrambled transmission may be unscrambled by demodulating the received scrambled transmission, based on demodulating using the received receiver adjustment value corresponding to the transmitter adjustment value (908).

For example, configuring the network receiver may include modifying a shape of a current signal constellation in use for demodulating received transmissions at the network receiver.

For example, configuring the network receiver may include modifying a shape of a current decision region in use for demodulating received transmissions at the network receiver.

For example, configuring the network receiver may include modifying a size of a current decision region in use for demodulating received transmissions at the network receiver.

For example, configuring the network receiver may include modifying a shape of a current signal constellation in use for demodulating received transmissions at the network receiver, to the asymmetric signal constellation.

For example, configuring the network receiver may include configuring the network receiver to unscramble received scrambled transmissions in accordance with adaptive multiresolution modulation.

For example, configuring the network receiver may include configuring the network receiver to unscramble received scrambled transmissions in accordance with decryption and adaptive multiresolution modulation.

For example, unscrambling the received scrambled transmission may include demodulating the received scrambled transmission, based on a predetermined decision region.

One skilled in the art of computing will appreciate that many other types of techniques may be used for examples discussed herein, without departing from the discussion herein.

Features discussed herein are provided as example techniques that may be implemented in many different ways that may be understood by one of skill in the art of computing, without departing from the discussion herein. Such features are to be construed only as example features, and are not intended to be construed as limiting to only those Detailed descriptions.

For example, the one or more processors (e.g., hardware device processors) may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed:

1. A method comprising:
   determining a transmitter adjustment value for adjusting modulations at a transmitter;
   configuring the transmitter to transmit in accordance with an asymmetric signal constellation, based on the determined transmitter adjustment value;
   providing a legitimate receiver with a receiver adjustment value corresponding to the determined transmitter adjustment value; and
   transmitting, at the transmitter, scrambled transmissions, based on transmitting using the determined transmitter adjustment value.

2. The method of claim 1, wherein configuring the transmitter includes modifying a shape of a current signal constellation in use for transmitting at the transmitter.

3. The method of claim 1, wherein configuring the transmitter includes modifying a size of a current signal constellation in use for transmitting at the transmitter.

4. The method of claim 1, wherein configuring the transmitter includes modifying a shape of a current symmetric signal constellation in use for transmitting at the transmitter, to the asymmetric signal constellation.

5. The method of claim 1, wherein configuring the transmitter includes configuring the transmitter to transmit in accordance with adaptive multiresolution modulation.

6. The method of claim 1, wherein configuring the transmitter includes configuring the transmitter to transmit in accordance with encryption and adaptive multiresolution modulation.

7. The method of claim 1, wherein configuring the asymmetric signal constellation is based on a representation of signals modulated by a digital modulation scheme.

8. A method comprising:
   receiving, at a network receiver, from a transmitter, a receiver adjustment value corresponding to a transmitter adjustment value;
   configuring the network receiver to demodulate signals received from the transmitter, in accordance with an asymmetric signal constellation, based on the determined transmitter adjustment value;
   receiving, at the network receiver, a scrambled transmission from the transmitter; and
   unscrambling the received scrambled transmission by demodulating the received scrambled transmission, based on demodulating using the received receiver adjustment value corresponding to the transmitter adjustment value.

9. The method of claim 8, wherein configuring the network receiver includes modifying a shape of a current signal constellation in use for demodulating received transmissions at the network receiver.

10. The method of claim 8, wherein configuring the network receiver includes modifying a shape of a current decision region in use for demodulating received transmissions at the network receiver.

11. The method of claim 8, wherein configuring the network receiver includes modifying a size of a current decision region in use for demodulating received transmissions at the network receiver.

12. The method of claim 8, wherein configuring the network receiver includes modifying a shape of a current signal constellation in use for demodulating received transmissions at the network receiver, to the asymmetric signal constellation.

13. The method of claim 8, wherein configuring the network receiver includes configuring the network receiver to unscramble received scrambled transmissions in accordance with adaptive multiresolution modulation.

14. The method of claim 8, wherein configuring the network receiver includes configuring the network receiver to unscramble received scrambled transmissions in accordance with decryption and adaptive multiresolution modulation.

15. The method of claim 8, wherein unscrambling the received scrambled transmission includes demodulating the received scrambled transmission, based on a predetermined decision region.

16. A system comprising:
   a transmitter in a network, the transmitter including:
      at least one hardware device processor; and
      a non-transitory computer-readable storage medium storing instructions that are executable by the at least one hardware device processor to:
         scramble transmissions from the transmitter by:
            determining a transmitter adjustment value for adjusting modulations at the transmitter;

configuring the transmitter to transmit in accordance with an asymmetric signal constellation, based on the determined transmitter adjustment value;

providing a legitimate receiver with a receiver adjustment value corresponding to the determined transmitter adjustment value; and transmitting, at the transmitter, scrambled transmissions, based on transmitting using the determined transmitter adjustment value.

17. The system of claim 16, wherein configuring the transmitter includes modifying a shape of a current signal constellation in use for transmitting at the transmitter.

18. The system of claim 16, wherein configuring the transmitter includes modifying a size of a current signal constellation in use for transmitting at the transmitter.

19. The system of claim 16, wherein configuring the transmitter includes modifying a shape of a current symmetric signal constellation in use for transmitting at the transmitter, to the asymmetric signal constellation.

20. The system of claim 16, wherein configuring the transmitter includes configuring the transmitter to transmit in accordance with adaptive multiresolution modulation.

\* \* \* \* \*